United States Patent [19]

Jonas et al.

[11] Patent Number: 4,532,147

[45] Date of Patent: Jul. 30, 1985

[54] CACAO PRODUCT AND PROCESS THEREFOR

[75] Inventors: Rodger H. Jonas, Dover; Joseph W. Beel, Camden; William R. Lynch, Milford, all of Del.

[73] Assignee: General Foods Corporation, White Plains, N.Y.

[21] Appl. No.: 519,807

[22] Filed: Aug. 3, 1983

[51] Int. Cl.³ ............................................... A23L 1/28
[52] U.S. Cl. .................................... 426/655; 426/430; 426/540
[58] Field of Search ............... 426/631, 655, 430, 459, 426/507, 629, 253, 254, 540

[56] References Cited

U.S. PATENT DOCUMENTS

| | | | |
|---|---|---|---|
| 2,899,309 | 8/1959 | Rusoff | 426/631 |
| 3,056,677 | 10/1962 | Colten et al. | 426/655 |
| 3,754,928 | 8/1973 | Haney | 426/631 |
| 3,997,680 | 12/1976 | Chalin | 426/262 |
| 4,156,030 | 5/1979 | Eggen | 427/540 |

OTHER PUBLICATIONS

CRC Handbook of Food Additives, 2nd Edition, T. E. Furia Ed., vol. 2, pp. 251–253.

*Primary Examiner*—Raymond Jones
*Assistant Examiner*—Marianne S. Minnick
*Attorney, Agent, or Firm*—Basam E. Nabulsi; Thomas R. Savoie; Daniel J. Donovan

[57] ABSTRACT

Cacao bean shells are treated to develop a color. The resulting colored material is then extracted to produce a tasteless and odorless colorant.

6 Claims, No Drawings

4,532,147

CACAO PRODUCT AND PROCESS THEREFOR

The present invention relates to cacao products and to a process for producing the same. More particularly this invention is concerned with a tasteless and odorless colorant extracted from cacao materials and a process for producing said colorant.

Chocolate and cocoa products are derived from the fruit of *Theobroma cacao* which consists of pods containing numerous seeds embedded in a mass of pulpy mucilaginous material. The seeds in turn consist of two curiously folded cotyledons and a radicle enclosed within a fleshy envelope of fibrous and mucilaginous material. The whole seeds in raw or dried form are commonly referred to as cacao beans and it is in this sense that the term "beans" is used herein. Drying of the raw beans converts the fleshy envelope into a dense hard sheath designated in the trade and herein as "shell". The dried kernels within the envelope or shell from which chocolate and cocoa products of commerce are produced after suitable processing are, for brevity and ease of description, referred to hereinafter as the "nibs".

In the processing of cacao beans, much of the fruit may become waste material. Most notably among the waste components produced in cacao bean processing are shells. However, the waste material also comprises the cacao dust produced in processing as well as the remains of nibs that have been expressed to produce cocoa butter. Herefore there has been little economic use for these waste materials, and they have generally been disposed of as refuse or, alternatively, burnt.

Nonetheless, U.S. Pat. No. 4,156,030, issued to Eggen discloses a process for making a berry-like flavored coloring material by extracting the roasted shells or husks of cocoa beans with an acidified ethanol. This extract may be used as is, or evaporated to obtain a non-alcoholic extract.

Rusoff, U.S. Pat. No. 2,899,309 teaches that a colorant may be produced from any unroasted cacao material. In his process, Rusoff treats a non-water extractable cacao residue with a chemical reagent to produce a coloring material.

SUMMARY OF THE INVENTION

It has now been found that a tasteless and odorless colorant extact may be prepared from any cacao material. The process of the instant invention comprises: cocoa butter removal, alkalization, and alcoholic extraction.

DETAILED DESCRIPTION OF THE INVENTION

Any cacao material, preferably roasted cacao material, and more preferably roasted cacao material without cocoa butter may be used in the process of the instant invention. The roasting process may be any cacao roasting process. A more extensive discussion of cocoa roasting and other cacao processing steps can be found in *Chocolate, Cocoa and Confectionery: Science and Technology*, by B. W. Minifie (2nd. ed), which is hereby incorporated by reference. Nonetheless, it is still more preferred that the cacao material be waste cacao material such as cacao shells, cacao dust, cacao nibs from which cocoa butter has been expressed and the like.

If the cacao material contains cocoa butter, it is preferred that said cocoa butter be removed from the cacao material prior to the extraction step. Cocoa butter removal may be by any known means of removing cocoa butter from cacao materials.

To obtain the colorant of the instant invention, it is necessary to alkalize the cacao material. While the alkalization process may be any alkalization process which is approved for food processing, it is important that the degree of alkalization be controled. The importance of controling the alkalization lies in the fact that the colorant's shade is determined by the degree of alkalization. The three most important parameters to control the degree of alkalization are: the strength of the alkalizing agent, which is a function of the alkalizing agent's identity and its concentration; the temperature at which the alkalization is carried out at; and the duration of the alkalizing step. While any food grade alkali might be used, it is preferred that sodium, potassium, ammonium, and magnesium alkali compounds, more preferably the hydroxides and carbonates of these compounds, and most preferably potassium carbonate be the alkali used. Potassium carbonate is advantageously employed at a level up to about 3% by weight of the cacao material to be treated. While higher levels may be employed satisfactorily by adjusting the duration or temperature of the alkalization step, it is not desirable to do so in the United States due to the limit set by the Definitions and Standards of Cacao Products in Title 21, Part 14, Section 14.1 (a) of the Federal Food, Drug and Cosmetic Act of 1944, as amended.

While the alkalization temperature's criticality is only in conjunction with a specific alkali strength and duration of alkalization, alkalization is normally carried out between about ambient temperature and about 250° F. (121° C.). However, it is preferred that the alkalization is carried out at a temperature above ambient—restated, it is preferred that the alkalization process reactants are heated—, and it is more preferred that the temperature be between about 150° F. (66° C.) and about 210° F. (99° C.).

As noted above, the duration of the alkalization interacts with the alkali strength and the temperature of alkalization to produce the resulting color. Thus, depending upon the other conditions, the alkalization step may be carried on for between about 5 minutes and about 36 hours. However, it is preferred that the duration of the alkalization be between about 2 and about 18 hours.

The above mentioned interaction of these factors—alkali strength, temperature of, and duration of alkalization—is such that an approximately 3% potassium carbonate alkali at about 190° F. (89° C.) will produce a bright red color in about 2 hours and a gray red in about 17.5 hours.

Nonetheless, these time, temperature and alkali strength parameters presume atmospheric pressures. Changing the pressure will alter the relationship among these parameters.

Once the cacao material has been alkalized to the desired degree—the desired color—any remaining alkali may be removed. However, removal of the excess alkali is not necessary to obtaining the colorant extract of the instant invention.

It is advantageous to grind or otherwise break the alkalized cacao material up into small particles before extraction. Preferably the alkalized cacao materials have a particle size of less than about 1200 microns, and more preferedly, the alkalized cacao materials particle size is less than 800 microns during the extraction step.

Notwithstanding, it is preferred that the diameter of the cacao materials particles, after grinding, is at least about 5 microns.

The alkalized cacao materials are added to an extraction apparatus and the colorant is extracted with an alcohol approved for food usage, but preferably with ethanol. In one embodiment of the instant invention the alkalized cacao materials are extracted with ethanol under reflux conditions for between about 15 minutes and about 3 hours. In this embodiment, 1 part of alkalized cacao material is combined with between about 1 and about 100 parts of ethanol, but preferably, 1 part of cacao is combined with between about 1 and about 10 parts of ethanol, and more preferedly, 1 part of cacao is combined with between about 1.5 and about 4 parts of ethanol. The ethanol may be combined with water, but if it is, it is preferred that the ethanol comprise at least about 5%, more preferably at least about 15%, and most preferably at least about 25% of the cacoa shell-alkali-ethanol mixture.

Extraction prodces a liquid phase containing alcohol and the extracted components—the colorant—mixed with a residual sludge. The liquid phase is separated from the sludge, preferably in a filter press and the sludge is discarded. Generally the bulk of the alcohol is removed from the extract to give a concentrated coloring extract by any conventional separation method. Advantageously, the alcohol is removed by distillation, which distillation is preferedly preformed at atmospheric pressure. The residual extract after distillation typically contains about 0.1% by weight of alcohol and has a solids content of from about 95 to about 99.5%.

The separated sludge contains a considerable portion of alcohol and this alcohol is advantageously recovered by distilling the residue. The alcohol so obtained is normally combined with that recovered from the extract and may be used for extracting a fresh batch of alkalized cacao materials.

The liquid extracts by the process of the instant invention may be used in a number of ways. For example, the extract could be substituted along with a flavoring, into Example 6 of U.S. Pat. No. 4,156,030 issued to Eggen, which is hereby incorporated by reference, to produce a canned, retorted gelatine dessert. The tasteless and odorless extract of the instant invention could also be used to color a pudding, or to adjust the color of an undutched cocoa and thus obtain the preferred color of a dutched cocoa with the preferred flavor of a good, undutched cocoa.

Alternatively, the extract may be dried by any means such as drum drying, spray drying, freeze drying or the like to produce a powdered colorant. The resulting powder may be used to color a variety of products such as: gelatine dessert mixes, pudding and instant pudding dessert mixes, and ice creams.

The colorant of the instant invention is typically red, brown, gray, or a shade in between these colors, such as red-brown and the like. However, by using the colorant of the instant invention with other colorants, further colors can be obtained.

EXAMPLE 1

Roasted cocoa bean waste material, 300 gm, were ground until the resulting powder passed through a 10 mesh, U.S. seive size, screen, but was retained on a 20 mesh screen. These cocoa shell particles had particle sizes less than about 840 microns. The ground shell particles were then combined with 12 gm of potassium carbonate and 228 ml of water. This mixture was heated to 185° F. (85° C.) and agitated for 30 minutes. The mixture was then combined with 1050 ml of a 1:1 ethanol:water solution and refluxed for 2 minutes. A liquid phase was then separated from the cacao shell-alkali-ethanol mixture by filtration. Thereafter, the liquid phase was distilled to remove 99% of the alcohol and to thereby produce a concentrated liquid coloring extract. This extract was then spray-dried to produce 6 gm of a red-brown colorant in powder form.

EXAMPLE 2

The alkali-ground cocoa shell-water mixture of Example 1 was mixed and heated to 185° F. (85° C.) for 1 hour. The other steps of Example 1 were thereafter followed to produce 6 gm of a brown colorant powder.

EXAMPLE 3

The colorant powder of Example 2, 1 gm, is combined with 100 gm of chocolate flavor, JELLO ® brand instant pudding dessert mix and 488 gm of milk. The combination is blended, and is then cooled in a refrigerator to produce a rich brown colored chocolate pudding dessert.

The above Examples are given only for the purpose of illustrating the invention. All parts and percentages are by weight.

We claim:
1. A process for preparing a tasteless and odorless colorant extract comprising the steps of:
 (a) removing from a cacao material any cocoa butter contained therein;
 (b) combining the cacao material with an alkalizing agent;
 (c) heating the alkalizing agent and cacao material combination to between ambient temperature and about 121° C. for between 5 minutes and 36 hours to effect a change in the cacao material's pigment color;
 (d) adding an aqueous alcoholic medium consisting essentially of alcohol and water to the cacao material after the alkalizing treatment for a period of time sufficient to extract the alkalized cacao material's pigments; and
 (e) separating the aqueous alcoholic medium containing said extracted cacao pigment from the cacao material.

2. A process according to claim 1 which further comprises the step of drying the aqueous alcoholic medium in a manner effective to produce a powdered colorant.

3. A process according to claim 1 which further comprises the step of grinding the cacao material of step (a).

4. A process according to claim 3 wherein said cacao material is ground to a particle size less than about 1200 microns.

5. A process according to claim 1 wherein said alcohol is ethanol.

6. A process according to claim 1 wherein said alcohol removal is by distillation.

* * * * *